United States Patent
Hegde et al.

(10) Patent No.: US 11,182,442 B1
(45) Date of Patent: Nov. 23, 2021

(54) APPLICATION USAGE BY SELECTING TARGETED RESPONSES TO SOCIAL MEDIA POSTS ABOUT THE APPLICATION

(71) Applicant: INTUIT INC., Mountain View, CA (US)

(72) Inventors: Tejaswini Hegde, Chicago, IL (US); Vijoy J. Caro, Chula Vista, CA (US); Aliza D. Carpio, San Diego, CA (US); Christine D. Roszak, San Diego, CA (US)

(73) Assignee: INTUIT, INC., Mountain View, CA (US)

( * ) Notice: Subject to any disclaimer, the term of this patent is extended or adjusted under 35 U.S.C. 154(b) by 1158 days.

(21) Appl. No.: 14/528,201

(22) Filed: Oct. 30, 2014

(51) Int. Cl.
  *G06F 16/9535* (2019.01)
  *H04L 12/18* (2006.01)
  *G06Q 50/00* (2012.01)

(52) U.S. Cl.
  CPC ...... *G06F 16/9535* (2019.01); *H04L 12/1813* (2013.01); *G06Q 50/01* (2013.01)

(58) Field of Classification Search
  USPC .......................................................... 705/319
  See application file for complete search history.

(56) References Cited

U.S. PATENT DOCUMENTS

| | | | | |
|---|---|---|---|---|
| 7,389,915 B1* | 6/2008 | Dyor | ...................... | G06Q 20/04 235/380 |
| 8,375,024 B2* | 2/2013 | Goeldi | ................... | G06Q 10/00 707/709 |
| 8,452,772 B1* | 5/2013 | Carpio | ................... | G06F 16/285 707/737 |
| 8,516,379 B2* | 8/2013 | D'Angelo | .............. | G06Q 10/10 715/751 |
| 8,712,943 B1* | 4/2014 | Kim | ........................ | G06Q 50/01 706/45 |
| 8,943,135 B2* | 1/2015 | Johnmar | ................. | H04L 67/22 709/203 |
| 8,972,894 B2* | 3/2015 | Ross | ...................... | H04L 67/306 715/811 |

(Continued)

OTHER PUBLICATIONS

Siersdorfer, Stefan, "Analyzing and Mining Comments and Comment Ratings on the Social Web", Aug. 24, 2014, ACM Transactions On the Web 8.3 Assoc Computing Machinery. (Year: 2014).*

*Primary Examiner* — Sangeeta Bahl
*Assistant Examiner* — Rebecca R Novak
(74) *Attorney, Agent, or Firm* — Patterson + Sheridan, LLP

(57) ABSTRACT

The disclosed embodiments provide a system that improves usage of an application. During operation, the system identifies, in a set of social media posts, a question related to use of the application. Next, the system responds to the set of social media posts with a set of answers to the question on one or more social media platforms and tracks social media responses to the set of answers. The system then calculates a set of relevance scores for the answers based on the tracked social media responses, wherein each relevance score represents a relevance of one of the answers to the question. Upon identifying the question in a subsequent social media post, the system selects an answer from the set of answers based on a relevance score of the answer and posts the answer in response to the subsequent social media post.

19 Claims, 5 Drawing Sheets

(56) References Cited

U.S. PATENT DOCUMENTS

| | | | |
|---|---|---|---|
| 9,015,162 B2* | 4/2015 | Chi | G06Q 50/01 |
| | | | 707/737 |
| 9,026,916 B2* | 5/2015 | Kanjirathinkal | G06Q 10/10 |
| | | | 715/738 |
| 9,311,823 B2* | 4/2016 | Byron | G09B 7/00 |
| 9,424,611 B2* | 8/2016 | Kanjirathinkal | G06Q 50/01 |
| 9,483,802 B2* | 11/2016 | Gaedcke | G06Q 50/01 |
| 9,621,601 B2* | 4/2017 | Johnson, Jr. | G06Q 10/101 |
| 10,162,884 B2* | 12/2018 | Thirugnanasundaram | |
| | | | G06Q 10/10 |
| 10,475,042 B2* | 11/2019 | Skiba | G06Q 30/016 |
| 2009/0162824 A1* | 6/2009 | Heck | G06N 3/004 |
| | | | 434/322 |
| 2010/0030769 A1* | 2/2010 | Cao | G06F 16/338 |
| | | | 707/738 |
| 2010/0119053 A1* | 5/2010 | Goeldi | G06Q 10/00 |
| | | | 379/265.09 |
| 2010/0235311 A1* | 9/2010 | Cao | G06F 16/9535 |
| | | | 706/46 |
| 2011/0106746 A1* | 5/2011 | Ventilla | G06Q 10/10 |
| | | | 706/50 |
| 2011/0288897 A1* | 11/2011 | Erhart | G06Q 10/06 |
| | | | 705/7.13 |
| 2012/0059816 A1* | 3/2012 | Narayanan | G06F 16/9535 |
| | | | 707/710 |
| 2012/0166457 A1* | 6/2012 | Ross | G06F 16/9535 |
| | | | 707/755 |
| 2012/0331391 A1* | 12/2012 | Kal | G06Q 10/10 |
| | | | 715/738 |
| 2013/0046760 A1* | 2/2013 | Evans | G06Q 50/01 |
| | | | 707/728 |
| 2013/0151347 A1* | 6/2013 | Baldwin | G06Q 30/0201 |
| | | | 705/14.66 |
| 2013/0224713 A1* | 8/2013 | Ajmera | G09B 7/00 |
| | | | 434/322 |
| 2013/0282603 A1* | 10/2013 | Gaedcke | G06Q 30/0241 |
| | | | 705/319 |
| 2013/0317808 A1* | 11/2013 | Kruel | H04L 51/32 |
| | | | 704/9 |
| 2014/0032657 A1* | 1/2014 | Johnmar | G06Q 50/01 |
| | | | 709/204 |
| 2014/0137001 A1* | 5/2014 | Baldwin | G06Q 50/01 |
| | | | 715/753 |
| 2014/0270145 A1* | 9/2014 | Erhart | H04M 3/5166 |
| | | | 379/265.13 |
| 2015/0139415 A1* | 5/2015 | Skiba | H04M 3/5133 |
| | | | 379/265.09 |
| 2015/0170152 A1* | 6/2015 | Shaffer | G06Q 30/016 |
| | | | 705/304 |
| 2015/0193683 A1* | 7/2015 | Freed | G06N 5/02 |
| | | | 706/11 |

* cited by examiner

APPLICATION USAGE BY SELECTING TARGETED RESPONSES TO SOCIAL MEDIA POSTS ABOUT THE APPLICATION

BACKGROUND

Related Art

The disclosed embodiments relate to techniques for providing relevant information to users. More specifically, the disclosed embodiments relate to techniques for improving application usage by selecting targeted responses to social media posts about the applications.

Social media platforms are commonly used by individuals and organizations to promote the adoption and use of goods, services, or products. For example, a company may use a social network or microblogging service to post a promotion, offer, support content, announcement, or other information related to the company's products or industries. The company may also use social media platforms to respond to customer questions or contribute to discussions related to use of the products.

However, creators of product- or business-oriented social media posts may be unable to determine if the social media posts are effective at answering customer questions or fulfilling customer needs. For example, a post for promoting or supporting use of a product may be perceived as helpful, irrelevant, or irritating by recipients of the post. As a result, the post may potentially reduce instead of improve the adoption or use of the product if the post is not targeted to the right set of users.

Consequently, use of promotional social media may be facilitated by techniques for gauging the relevance or effectiveness of promotional social media posts.

SUMMARY

Social media platforms are commonly used by users to express concerns or ask questions. Such concerns or questions may indicate an interest in specific goods, products or services provided by an individual or organization. For example, a user who asks a question related to income taxes on a social network may be interested in a tax-preparation application that assists the user with filing his/her income taxes.

As a result, social media platforms may be used to promote the use of applications that fulfill needs that are expressed in the social media posts of users. For example, an implicit or explicit question related to filing taxes may be detected in a social media post, and an answer to the question may be selected and posted in response to the social media post. To improve the relevance or effectiveness of the answer, the social media response to the answer may be tracked and used to calculate a relevance score that represents the relevance of the answer to the question. A positive social media response (e.g., like, view, share, repost, positive comment, positive rating, follow, etc.) may increase the relevance score, while a negative social media response (e.g., dislike, hide, ignore, negative comment, negative rating, unfollow, etc.) may decrease the relevance score.

The relevance score of the answer may then be used to prioritize use of the answer in responding to subsequent social media posts that contain the question. For example, relevance scores may be calculated for a set of possible answers to the question based on the social media responses to the answers. Selection of an answer for use in responding to the question in a subsequent media post may be weighted based on the relevance score of the answer and the relevance scores of other answers in the set. Answers with higher relevance scores (e.g., more relevant answers) may thus be posted in response to the question more frequently than answers with lower relevance scores (e.g., less relevant answers). Consequently, the answers may be more useful to the users than randomly selected or posted promotional social media posts and result in increased adoption or usage of an application promoted by the answers.

The disclosed embodiments provide a system that improves usage of an application. During operation, the system identifies, in a set of social media posts, a question related to use of the application. Next, the system responds to the set of social media posts with a set of answers to the question on one or more social media platforms and tracks social media responses to the set of answers. The system then calculates a set of relevance scores for the answers based on the tracked social media responses, wherein each relevance score represents a relevance of one of the answers to the question. Upon identifying the question in a subsequent social media post, the system selects an answer from the set of answers based on a relevance score of the answer and posts the answer in response to the subsequent social media post.

In some embodiments, the system also updates the relevance score for the answer based on a social media response to the posted answer.

In some embodiments, updating the relevance score for the answer based on the social media response to the posted answer includes assigning individual relevance scores to one or more social media actions in the social media response, and including the individual relevance scores in a calculation of the relevance score for the answer.

In some embodiments, the set of social media actions includes at least one of a view, a like, a dislike, a comment, a rating, a tone, a favorite, a share, a repost, a follow, an ignore, and a hide.

In some embodiments, identifying the question related to use of the application in the set of social media posts includes obtaining a set of keywords related to the question, and identifying one or more of the keywords in the set of social media posts.

In some embodiments, identifying the question related to use of the application in the set of social media posts further includes updating the set of keywords with one or more additional keywords from the subsequent social media post based on the relevance score.

In some embodiments, selecting the answer from the set of answers to be posted in response to the question based on a relevance score of the answer includes weighting a selection of the answer based on the relevance score of the answer and other relevance scores of other answers in the set of answers.

In some embodiments, each of the relevance scores further represents the relevance of one of the answers to a user demographic associated with the social media posts or a timing of the social media posts.

In some embodiments, the answer includes at least one of an article related to use of the application and support content for supporting use of the application.

In some embodiments, the application includes a financial-management application.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Social media platforms are commonly used by users to express concerns or ask questions. Such concerns or questions may indicate an interest in specific goods, products or services provided by an individual or organization. For example, a user who asks a question related to income taxes on a social network may be interested in a tax-preparation application that assists the user with filing his/her income taxes.

As a result, social media platforms may be used to promote the use of applications that fulfill needs that are expressed in the social media posts of users. For example, an implicit or explicit question related to filing taxes may be detected in a social media post, and an answer to the question may be selected and posted in response to the social media post. To improve the relevance or effectiveness of the answer, the social media response to the answer may be tracked and used to calculate a relevance score that represents the relevance of the answer to the question. A positive social media response (e.g., like, view, share, repost, positive comment, positive rating, follow, etc.) may increase the relevance score, while a negative social media response (e.g., dislike, hide, ignore, negative comment, negative rating, unfollow, etc.) may decrease the relevance score.

The relevance score of the answer may then be used to prioritize use of the answer in responding to subsequent social media posts that contain the question. For example, relevance scores may be calculated for a set of possible answers to the question based on the social media responses to the answers. Selection of an answer for use in responding to the question in a subsequent media post may be weighted based on the relevance score of the answer and the relevance scores of other answers in the set. Answers with higher relevance scores (e.g., more relevant answers) may thus be posted in response to the question more frequently than answers with lower relevance scores (e.g., less relevant answers). Consequently, the answers may be more useful to the users than randomly selected or posted promotional social media posts and result in increased adoption or usage of an application promoted by the answers.

Figure 1:
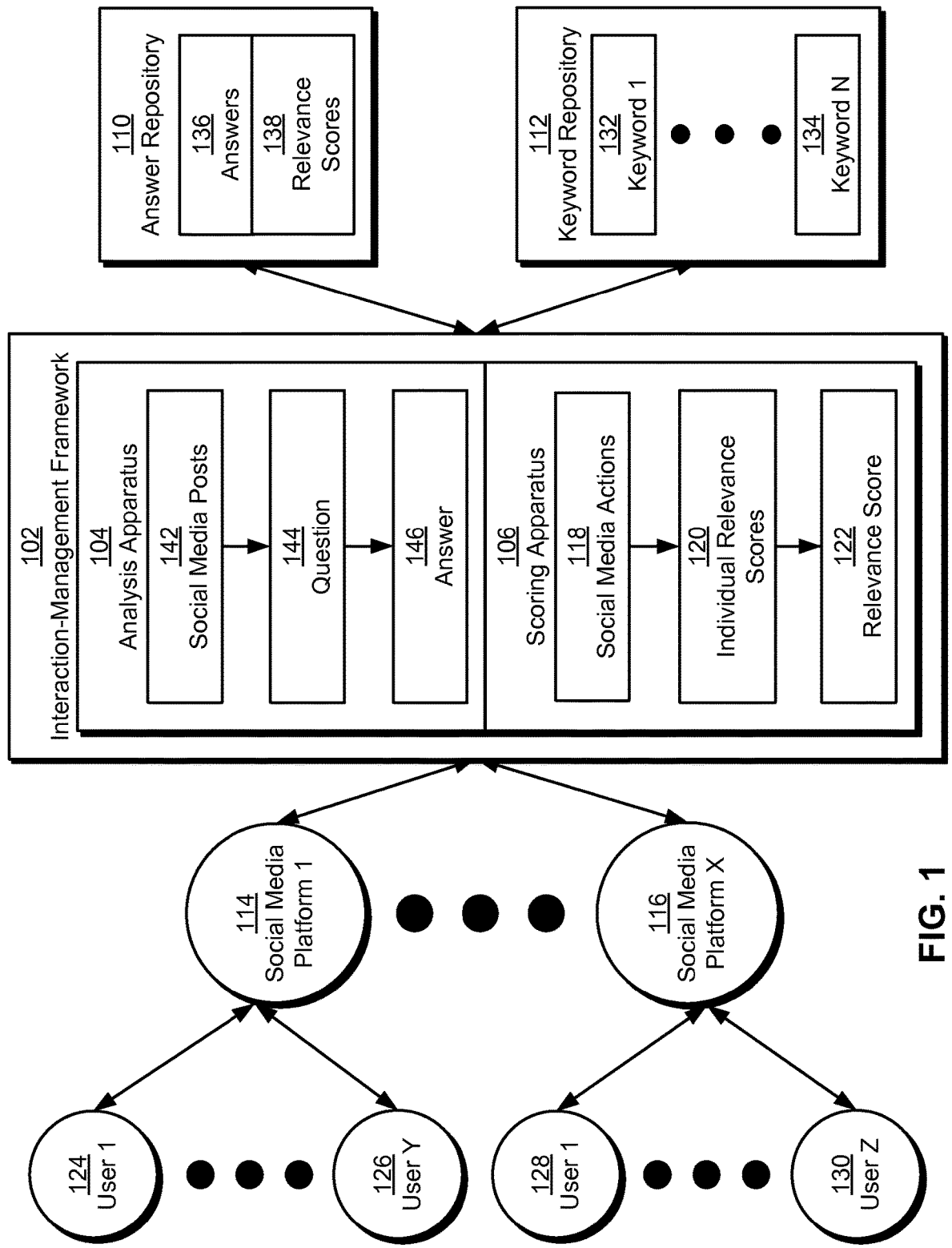
FIG. 1 shows a schematic of a system in accordance with the disclosed embodiments.

FIG. 1 shows a schematic of a system in accordance with the disclosed embodiments. The system of FIG. 1 includes an interaction-management framework 102 that facilitates interaction with a set of users (e.g., user 1 124, user y 126, user 1 128, user z 130) on a set of social media platforms (e.g., social media platform 1 114, social media platform x 116).

The social media platforms may be used by the users to interact with one another. For example, a user may create user profiles on multiple social networking services, microblogging platforms, photo-sharing websites, video-sharing websites, music-sharing websites, online forums, question-and-answer (Q&A) systems, and/or other mechanisms for computer-based social interaction. The user may use the social media platforms to interact with friends, family members, colleagues, customers, acquaintances, employers, companies, organizations, and/or other entities on the social media platforms by sharing posts, comments, likes, photos, videos, audio, events, activities, articles, and/or messages with the other entities.

During use of the social media platforms, the users may create a number of publicly accessible social media posts 142 such as status updates, blog posts, microblog posts, forum posts, questions in a Q&A system, images, video, and/or audio. An analysis apparatus 104 in interaction-management framework 102 may monitor the social media platforms for one or more social media posts 142 containing a question 144 that may be addressed by interaction-management framework 102. For example, analysis apparatus 104 may use one or more application-programming interfaces (APIs) with the social media platforms and/or one or more mechanisms for aggregating or scraping data to obtain social media posts 142. Analysis apparatus 104 may then analyze the content of social media posts 142 to identify the presence of question 144 in one or more social media posts 142.

Question 144 may relate to the use of a product or service that is promoted by interaction-management framework 102. For example, interaction-management framework 102 may promote the use of an application such as a tax-preparation application, accounting application, and/or a financial-management application on the social media platforms. As a result, question 144 may implicitly or explicitly mention topics such as accounting, personal financial management, small business financial management, payroll, billing, budgeting, employment, banking, loans, changes in financial situation, and/or tax preparation. For example, a social media post may explicitly mention income taxes in a question (e.g., question 144) such as "How do I find my W-2 if my company is no longer in business?" Conversely, the social media post may contain an implicit question (e.g., question 144) or concern related to tax preparation by mentioning a change in status that may impact tax filing (e.g., marriage, new child, relocation, new employer, starting a new business, etc.).

To identify question 144 in social media posts 142, analysis apparatus 104 may obtain a set of keywords (e.g., keyword 1 132, keyword n 134) related to question 144 from a keyword repository 112. A social media post that includes one or more of the keywords may be identified to include the question. For example, analysis apparatus 104 may identify a tax-preparation question 144 in social media posts 142 based on key words or phrases related to tax forms, tax filing, and/or changes in status (e.g., change in employment, retirement, marriage, children, new home, etc.) that may affect tax filing for a user.

Next, analysis apparatus 104 may select an answer 146 for use in responding to each social media post in which question 144 is found. More specifically, analysis apparatus 104 may select answer 146 by obtaining a set of possible answers 136 to question 144, along with a set of relevance scores 138 for answers 136, from an answer repository 110. Answers 136 may include offers, articles, images, audio, video, tips, suggestions, support content, and/or other information that addresses question 144. For example, answers 136 may be created by users with domain knowledge in the topic related to question 144 and/or users who participate in discussions related to the topic on the social media platforms.

Because answers 136 may provide value to users asking question 144, answers 136 may improve adoption or use of product or service related to question 144. For example, answers 136 to question 144 related to a change in financial situation may include suggestions for filing taxes and/or managing finances based on the change. If answers 136 are perceived to be useful to users asking question 144, answers 136 may encourage the users to receive more information from interaction-management framework 102 (e.g., by following interaction-management framework 102 on one or more social media platforms) and/or look into using tax-preparation and/or financial-management applications or solutions that are promoted by interaction-management framework 102.

Each relevance score may represent the relevance of the corresponding answer to question 144. In addition, the relevance score may be calculated based on a social media response to the answer. For example, answers 136 may be posted in response to one or more social media posts 142 containing question 144, and relevance scores 138 may be calculated based on social media actions 118 applied to social media posts 142. As described in further detail below, an answer with a more positive social media response may have a higher or more positive relevance score, while an answer with a more negative social media response may have a lower or more negative relevance score. If the answer does not have an associated social media response (e.g., if the answer has never been posted), the answer may be assigned a default relevance score of 0. Alternatively, the answer may lack a relevance score until the answer is posted and a social media response for the posted answer can be tracked.

In one or more embodiments, analysis apparatus 104 selects answer 146 based on the relevance score of answer 146 and the relevance scores of other answers 136 to question 144. Such selection may be weighted so that more-relevant answers (e.g., answers with higher relevance scores) may be selected more frequently than less-relevant answers (e.g., answers with lower relevance scores). After answer 146 is selected, analysis apparatus 104 and/or another component of interaction-management framework 102 may post answer 146 in response to the social media post on the social media platform from which the social media post was received.

After answer 146 is posted, a scoring apparatus 106 may update a relevance score 122 for answer 146 based on the social media response to the posted answer 146. First, scoring apparatus 106 may track one or more social media actions 118 in the social media response and assign individual relevance scores 120 to social media actions 118. For example, scoring apparatus 106 may monitor the social media platform for social media actions 118 that are applied to the posted answer 146. Scoring apparatus 106 may assign individual relevance scores 120 to social media actions 118 so that positive social media actions 118 such as likes, shares, reposts, favorites, follows, positive ratings, and/or positive comments are given positive individual relevance scores 120 and negative social media actions 118 such as hides, ignores (e.g., lack of social media response), dislikes, and/or negative comments are given negative individual relevance scores 120. Scoring apparatus 106 may further set individual relevance scores 120 to reflect the relative strengths of the corresponding social media actions. A social media action that is strongly positive or negative (e.g., repost, share, hide) may have an individual relevance score that is greater in magnitude than a social media action that is less strongly positive or negative (e.g., like, dislike, view, ignore). Similarly, a comment or rating that is strongly positive or negative may have an individual relevance score with a greater absolute numeric value than a comment or rating that is less strongly positive or negative.

Next, scoring apparatus 106 may include individual relevance scores 120 in the calculation of the overall relevance score 122 for answer 146. For example, scoring apparatus 106 may aggregate (e.g., sum) individual relevance scores 120 into relevance score 122. As a new social media action is performed in response to answer 146, the individual relevance score of the social media action may be added to relevance score 122. As a result, scoring apparatus 106 may calculate relevance score 122 as an up-to-date representation of the social media response to answer 146 across one or more social media platforms on which answer 146 is posted in response to one or more social media posts 142 containing question 144.

Such continuous updating of relevance score 122 and/or relevance scores 138 for answers 136 to question 144 may facilitate the effective promotion of goods, services, and/or products on the social media platforms by interaction-management framework 102. For example, interaction-management framework 102 may use relevance scores 138 to identify one or more answers 136 that are perceived by users to be the most relevant or useful and increase the posting of the answers in response to subsequent social media posts 142 containing question 144. In turn, the posted answers may be better at encouraging adoption or use of an application and/or product related to question 144 than answers that are less relevant or useful to the users.

Targeting of social media posts 142 with responses containing answer 146 and/or other answers 136 may further be facilitated by updating keywords associated with question 144 in keyword repository 112 with one or more additional keywords from social media posts 142 based on relevance scores 138. For example, a posted answer 146 with an overwhelmingly positive social media response may trigger the addition of keywords from the social media post targeted by answer 146 to the set of keywords related to question 144 in keyword repository 112. Conversely, one or more keywords may be removed from the set of keywords associated with question 144 if the keyword(s) are found in social media posts 142 that do not result in increases in relevance score 122 for answer 146. In other words, targeting of users with answers to questions in social media posts may evolve through the selection of relevant answers to the questions and the matching of potential answers to the questions based on keywords in the social media posts.

Those skilled in the art will appreciate that the system of FIG. 1 may be implemented in a variety of ways. First, analysis apparatus 104, scoring apparatus 106, answer repository 110, and keyword repository 112 may execute on the same system or on different systems. For example, analysis apparatus 104, scoring apparatus 106, answer repository 110, and keyword repository 112 may be provided by a single physical machine, multiple computer systems, one or more virtual machines, a grid, one or more databases (e.g., relational databases, graph databases, etc.), one or more filesystems, and/or a cloud computing system. Analysis apparatus 104 and scoring apparatus 106 may additionally be implemented together and/or separately by one or more hardware and/or software components and/or layers.

Second, analysis apparatus 104 may select answer 146 from the set of answers 136 using a number of techniques. As mentioned above, analysis apparatus 104 may select answers 136 using frequency distributions that reflect the relevance scores 138 of answers 136. As a result, an answer with a relevance score that is twice as high as the relevance score of another answer may be selected twice as frequently as the other answer. Alternatively, analysis apparatus 104 may use a fixed frequency distribution to select answers 136 according to a ranking of answers 136 by relevance scores 138. The first answer in the ranking (e.g., the answer with the highest relevance score) may be assigned the highest frequency (e.g., 30%) in the distribution, the second answer in the ranking (e.g., the answer with the second highest relevance score) is assigned the second highest frequency (e.g., 20%) in the distribution, and so on.

Analysis apparatus 104 may also apply one or more thresholds to the relevance scores in selecting answers 136, in lieu of or in addition to weighted selection of answers 136 for use in responding to social media posts 142. For example, analysis apparatus 104 may omit an answer from the set of possible answers 136 to question 144 after the relevance score of the answer falls below a threshold. Once an answer is removed from the set of possible answers 136, analysis apparatus 104 may add a new answer to the set to assess the social media response to the new answer and determine if the new answer is more relevant to question 144 than other answers in the set.

Third, scoring apparatus 106 may calculate relevance score 122 for answer 146 in a number of ways. As described above, relevance score 122 may be calculated by summing and/or otherwise aggregating individual relevance scores 120 for social media actions 118 in the social media response to answer 146. Relevance score 122 may additionally be based on the recentness of social media actions 118 in the social media response. For example, the effect of older social media actions on relevance score 122 may be reduced by scaling down individual relevance scores 120 for the social media actions as time elapses after the occurrence of the social media actions. In another example, relevance score 122 may be calculated based on a sliding window (e.g., the last two weeks) so that social media actions 118 that fall within the sliding window contribute to relevance score 122 and social media actions 118 that fall outside the sliding window (e.g., older social media actions) no longer contribute to relevance score 122.

Individual relevance scores 120 may also be adjusted over time to better reflect the relationships of specific social media actions 118 to the relevance of answer 146 and/or a goal associated with answer 146. For example, a strong correlation between a social media action such as reposting of answer 146 and adoption of an application promoted by answer 146 may result in an increase in the individual relevance score of the social media action. On the other hand, the relevance score may be lowered for a social media action (e.g., a like or view) that is originally perceived to increase the relevance of answer 146 to question 144 but does not strongly correlate with an increase in the conversion rate for the application.

Figure 2:
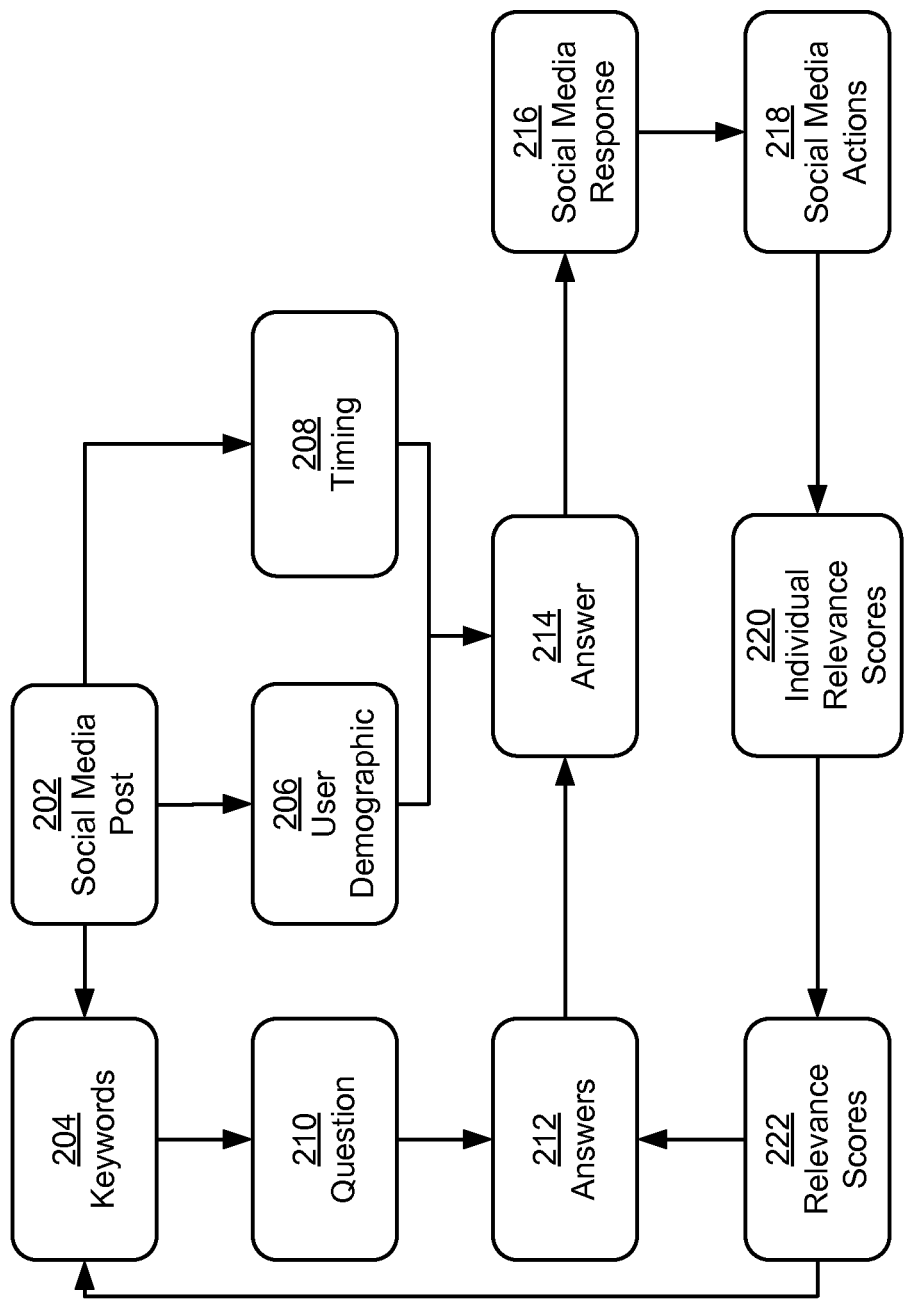
FIG. 2 shows the selection of an answer to a question in a social media post in accordance with the disclosed embodiments.

FIG. 2 shows the selection of an answer 214 to a question 210 in a social media post 202 in accordance with the disclosed embodiments. As mentioned above, question 210 may be explicitly or implicitly included in social media post 202. For example, social media post 202 may explicitly state a question related to tax preparation, such as "We just got married! Should we file taxes jointly or separately?" Alternatively, social media post 202 may implicitly include question 210 by mentioning a topic related to question 210. For example, social media post 202 may implicitly ask a question related to a change in financial situation by announcing a life event related to the change, such as a marriage, a change in employment, retirement, or a birth of a child.

To identify question 210 in social media post 202, a set of keywords 204 related to question 210 may be obtained from a keyword repository, such as keyword repository 112 of FIG. 1. If one or more keywords 204 are found in social media post 202, question 210 may be identified in social media post 202. For example, a question about a marriage-related change in tax filing status may be associated with keywords 204 such as "married," "marriage," "wedding," "husband," "wife," "filing," "jointly," and/or "separately." Searches of one or more social media platforms for keywords 204 may be performed to identify a set of social media posts (e.g., social media post 202) containing question 210.

Once question 210 is identified in social media post 202, an answer 214 is selected from a set of possible answers 212 to question 210. As described above, answers 212 may be obtained from an answer repository, such as answer repository 110 of FIG. 1. Answers 212 may be used to improve usage of a service and/or product. For example, answers 212 may provide tips related to personal finance, tax preparation, budgeting, and/or accounting with a goal of promoting use of a financial-management application.

Answer 214 may be selected from answers 212 based on a set of relevance scores 222 for answers 212. Each relevance score may represent the relevance and/or effectiveness of the corresponding answer in addressing question 210. In addition, relevance scores 222 may be calculated based on social media actions 218 that are performed after answers 212 are posted in response to social media posts (e.g., social media post 202) containing question 210. More specifically, a social media response (e.g., social media response 216) to each answer may be tracked after the answer is posted in response to one or more social media posts containing question 210 on one or more social media platforms. The social media response may include one or more social media actions (e.g., social media actions 218) that are applied to the answer, such as views, ignores, likes, dislikes, comments, ratings, tones (e.g., positive or negative) of the comments, favorites, shares, reposts, follows, ignores, and/or hides.

To calculate a relevance score for an answer, an individual relevance score (e.g., individual relevance scores 220) may be assigned to each social media action in the social media response. A social media action that indicates a positive social media response (e.g., like, comment with a positive tone, positive rating, share, repost, favorite, follow, view, etc.) may be given a positive individual relevance score, while a social media action that indicates a negative social media response (e.g., dislike, ignore, hide, comment with a negative tone, negative rating, unfollow, etc.) may be given a negative individual relevance score. Individual relevance scores for all social media actions applied to the answer may then be aggregated (e.g., summed) into an overall relevance score for the answer. In other words, social media actions applied to one or more postings of the answer may be used to infer the sentiment of users performing the social media actions and, in turn, determine the relevance of the answer to the users.

On the other hand, an answer that lacks an associated social media response (e.g., an answer that has never been posted in response to question 210) may have a default neutral relevance score (e.g., 0) or lack a relevance score. The relevance score for the answer may be updated or set after the answer is posted in response to question 210 and the social media response (e.g., social media response 216) to the posted answer is enabled.

As discussed above, selection of answer 214 for use in responding to social media post 202 may be weighted based on the relevance score of answer 214 and the relevance scores of other answers in the set of possible answers 212. For example, answer 214 may be randomly selected at a frequency that is calculated by dividing the relevance score for answer 214 by the sum of all relevance scores 222 for all answers 212 to question 210. Alternatively, answer 214 may be selected according to the position of answer 214 in a ranking of answers 212 by decreasing relevance score, with each position in the ranking assigned a pre-specified frequency (e.g., 30%, 20%, 15%, etc.) for the position.

Answer 214 may additionally be selected based on a user demographic 206 and/or a timing 208 associated with social media post 202. User demographic 206 may include the age, gender, location, profession, income level, marital status, and/or other publicly available information (e.g., profile information) for the user who created social media post 202. Timing 208 may relate to the hour, day, week, month, and/or year in which social media post 202 was created.

User demographic 206 and timing 208 may enable the targeting of users with answers 212 based on the user profiles of the users and/or seasons associated with the users' postings of question 210. For example, question 210 may relate to a life event that results in a change in financial situation, such as a marriage, birth of a new child, change in employment, or a purchase of a home. Answers 212 may include articles, offers, tips, suggestions, and/or other information for promoting the use of a financial-management application, accounting application, and/or tax-preparation application in managing the change in financial situation. Answers 212 may thus be fit to the financial needs of users based on the users' genders, income levels, professions, geographic locations, marital statuses, and/or other user demographic 206 attributes. Moreover, social media posts created during tax season may be targeted with answers related to filing income taxes, social media posts created in late spring or early summer may be targeted with answers related to purchasing a home, and social media posts created during other times of the year may be targeted with answers related to personal financial management.

To enable selection of answer 214 based on user demographic 206, a separate set of relevance scores 222 may be calculated for each user demographic 206 targeted by answers 212. For example, social media responses to answers 212 may be tracked across different genders, ages, income levels, locations, and/or other user demographic 206 attributes. The social media responses may then be used to calculate separate sets of relevance scores 222 for social media actions 218 from users with different user demographic 206 attributes and/or sets of user demographic 206 attributes.

Similarly, answers 212 may be assigned to time periods (e.g., hours, days, weeks, months, etc.) during which answers 212 may be more relevant to question 210. Answer 214 may be available for selection and/or selected more frequently in response to question 210 if timing 208 falls within the time period assigned to answer 214. For example, selection of an answer that relates to filing income taxes may be enabled for two months preceding a tax-filing deadline and disabled at other times of the year. Alternatively, the relevance score of the answer may be increased during the time period assigned to the answer and decreased outside of the time period.

The selected answer 214 is then posted in response to question 210. For example, answer 214 may be posted on the social media platform from which social media post 202 was obtained. In addition, answer 214 may be addressed to the user who created social media post 202. For example, answer 214 may be sent to the user by including a string that contains the "@" symbol followed by the username of the user on the social media platform.

Social media response 216 to the posted answer 214 may then be tracked to gauge the relevance of answer 214 to question 210 for the user. As described above, social media actions 218 in social media response 216 may be assigned individual relevance scores 220, which are then included in the calculation of an overall relevance score for answer 214. For example, social media actions 218 that are performed in response to the posted answer 214 may be tracked, and individual relevance scores 220 from the tracked social media actions 218 may be added to the overall relevance score for answer 214. The updated relevance score and/or other relevance scores (e.g., relevance scores 222) for other answers (e.g., answers 212) to question 210 may then be used in the subsequent selection of answer 214 and/or the other answers in response to additional social media posts containing question 210.

Figure 3:
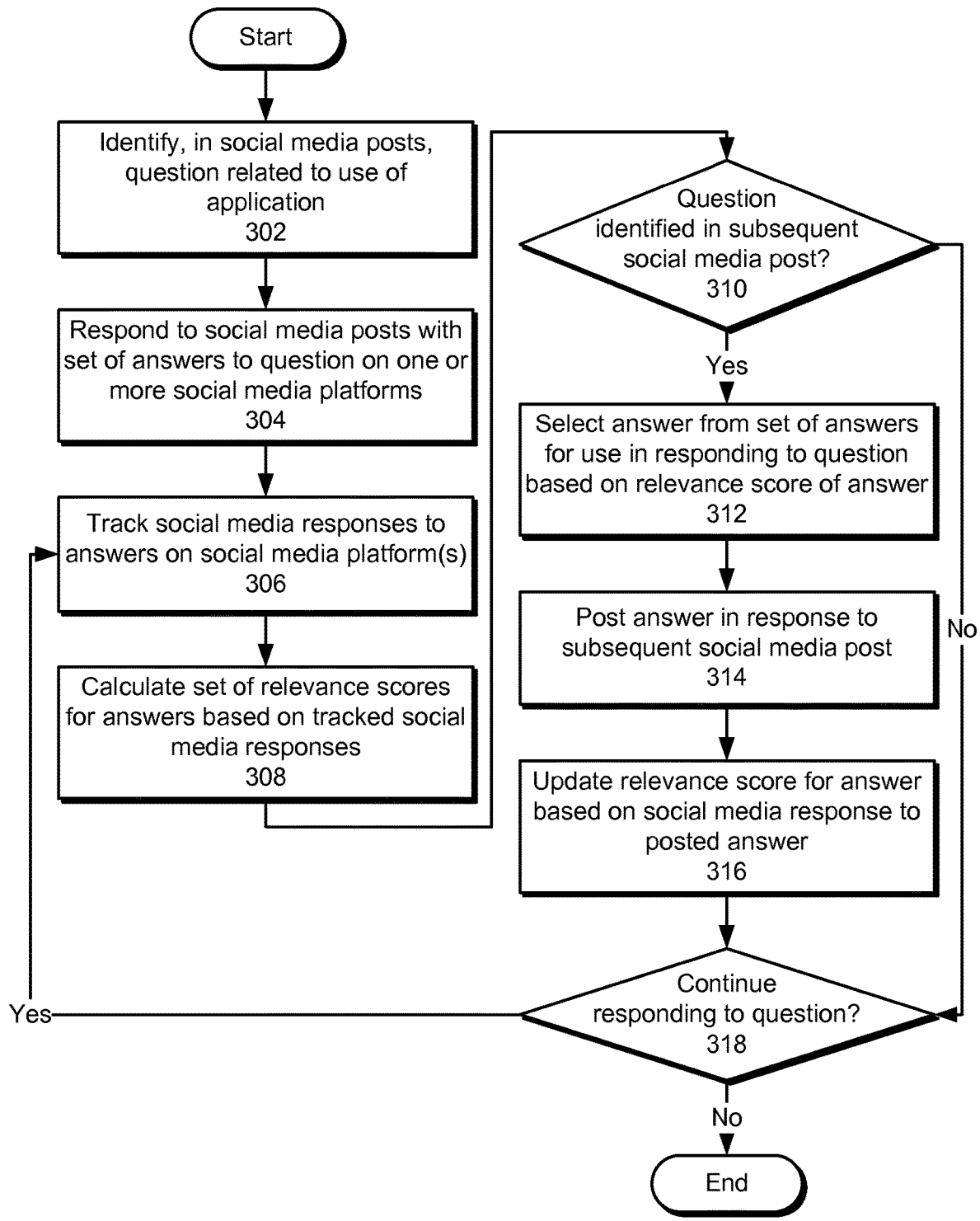
FIG. 3 shows a flowchart illustrating the process of improving usage of an application in accordance with the disclosed embodiments.

FIG. 3 shows a flowchart illustrating the process of improving usage of an application in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a question related to a use of an application is identified in a set of social media posts (operation 302). The question may be identified based on one or more keywords in the social media posts, as described in further detail below with respect to FIG. 4. For example, a question related to financial management or tax preparation may be identified based on the presence of key words or phrases related to changes in financial situation, tax forms, budgeting, and/or finances in the social media posts.

Next, a set of answers to the question is used to respond to the social media posts on one or more social media platforms (operation 304). Each answer may address the question in a different way. For example, answers to a financial-management question may include articles, tips, suggestions, and/or other information related to managing finances. The answers may also include offers, support content, or links to goods, products, or services that may assist with managing finances, such as financial-management applications. The answers may further adopt different tones or approaches to interacting with users on the social media platforms. For example, the answers may congratulate the users on recent life events (e.g., marriages, births, new employment, graduation, etc.), encourage the users to take actions related to the life events (e.g., saving, budgeting, filing taxes, increasing tax deductions, etc.), and/or remind the users of important dates (e.g., tax filing deadlines) related to the life events. Moreover, the answers may be adapted to various user locations, genders, age ranges, income levels, education levels, professions, and/or other user demographic attributes.

Social media responses to the answers on the social media platform(s) are also tracked (operation 306). Each social media response may include one or more social actions applied to an answer that was posted in response to the question. For example, the social media response to a posted answer may include a view, a like, a dislike, a comment, a rating, a tone (e.g., of a comment), a favorite, a share, a repost, a follow (e.g., of the entity posting the answer), an ignore, and/or a hide.

A set of relevance scores is then calculated for the answers based on the tracked social media responses (operation 308). Individual relevance scores may be assigned to social media actions from an answer's social media response, and the individual relevance scores may be included in the calculation of the relevance score for the answer. For example, numeric individual relevance scores may be summed and/or otherwise aggregated into an overall relevance score for the answer. The relevance score may also be calculated for a given user demographic and/or timing associated with the social media posts. The overall relevance score may thus represent the relevance of the answer to the question, user demographic, and/or timing, as inferred by the social media response to the answer after the answer is posted in response to the question on one or more social media platforms.

The question may be identified in a subsequent social media post (operation 310). For example, the question may be identified in the subsequent social media post using a search of one or more social media platforms for keywords related to the question. If the question is not identified in a subsequent social media post, a response to the subsequent social media post that answers the question may be omitted.

Once the question is identified in a subsequent social media post, an answer from the set of answers is selected for use in responding to the question based on the relevance score of the answer (operation 312). For example, selection of the answer may be weighted based on the relevance score of the answer and other relevance scores of other answers in the set of possible answers. As a result, the answer may be selected more frequently if the answer has a higher relevance score than other answers in the set and less frequently if the answer has a lower relevance score than other answers in the set.

The answer is posted in response to the subsequent social media post (operation 314), and the relevance score for the answer is updated based on the social media response to the posted answer (operation 316). For example, the relevance score may be increased for each positive social media action (e.g., view, like, positive comment, high rating, favorite, share, repost, follow, etc.) performed in response to the posted answer and decreased for each negative social media action (e.g., ignore, dislike, negative comment, low rating, hide, unfollow, etc.) performed in response to the posted answer. In other words, the relevance score may track the perceived relevance or usefulness of the answer to the question over time.

Responding to the question may continue (operation 318). For example, answers to the question may continue to be posted on the social media platforms as long as the question is relevant to use of an application, good, product, or service that is being promoted using the answers. If responding to the question is to continue, social media responses to the answers may continue to be tracked (operation 306), and relevance scores for the answers may be updated based on the tracked social media responses (operation 308). When the question is identified in a subsequent social media post (operation 310), an answer is selected for use in responding to the question based on the answer's relevance score (operation 312) and posted on the social media platform of the subsequent social media post in response to the subsequent social media post (operation 314). The relevance score for the answer is then updated based on the social media response to the posted answer on the social media platform (operation 316). Relevance scores and answers may thus be used to improve usage of the application and/or facilitate interaction with users on the social media platforms until the question is no longer being answered on the social media platforms.

Figure 4:
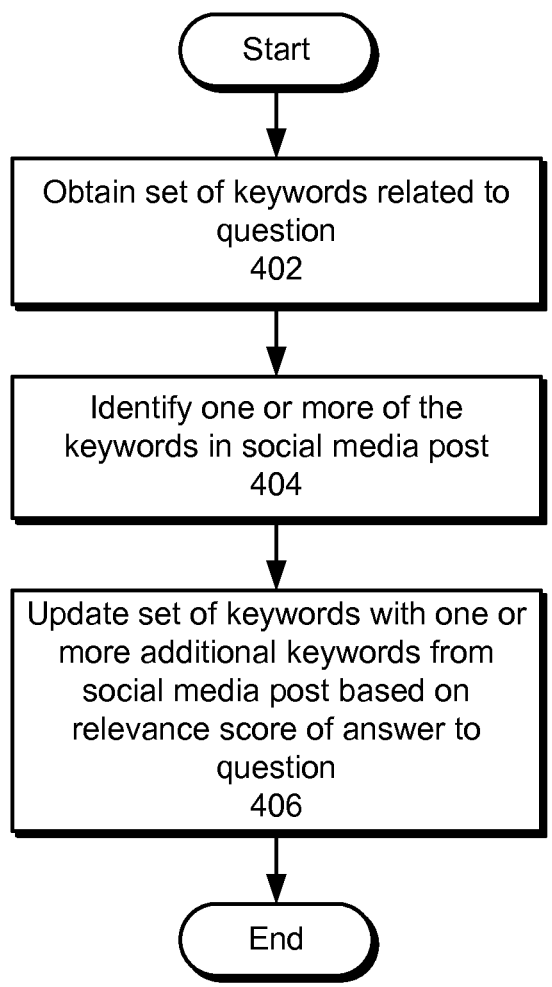
FIG. 4 shows a flowchart illustrating the process of identifying a question related to use of an application in a social media post in accordance with the disclosed embodiments.

FIG. 4 shows a flowchart illustrating the process of identifying a question related to use of an application in a social media post in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a set of keywords related to the question is obtained (operation 402). The keywords may initially be set by a user to identify one or more topics related to the question. For example, a question about a change in financial situation caused by a life event may include key words or phrases related to the life event (e.g., "marriage," "wedding," "birth," "new job," "graduation," "retire," "new house," "homeowner," etc.) and/or the financial situation (e.g., "budget," "file taxes," "income taxes," "jointly," "separately," "finances," "paycheck," "expenses," "mortgage").

Next, one or more of the keywords is identified in a social media post (operation 404). For example, a search of one or more social media platforms may be performed to identify social media posts on the social media platform(s) that contain keywords associated with the question. The question may be found in a social media post if the social media post contains one or more of the keywords related to the question. Answers to the question may then be selected and posted in response to the social media post, as discussed above.

The set of keywords is also updated with one or more additional keywords from the social media post based on the relevance score of an answer to the question (operation 406). For example, additional keywords from a social media post containing the question may be added to the set after an answer that is posted in response to the social media post receives an overwhelmingly positive social media response. Conversely, one or more keywords may be removed from the set if social media posts containing the keyword(s) result in a lukewarm or negative social media response to answers posted in response to the social media posts.

Figure 5:
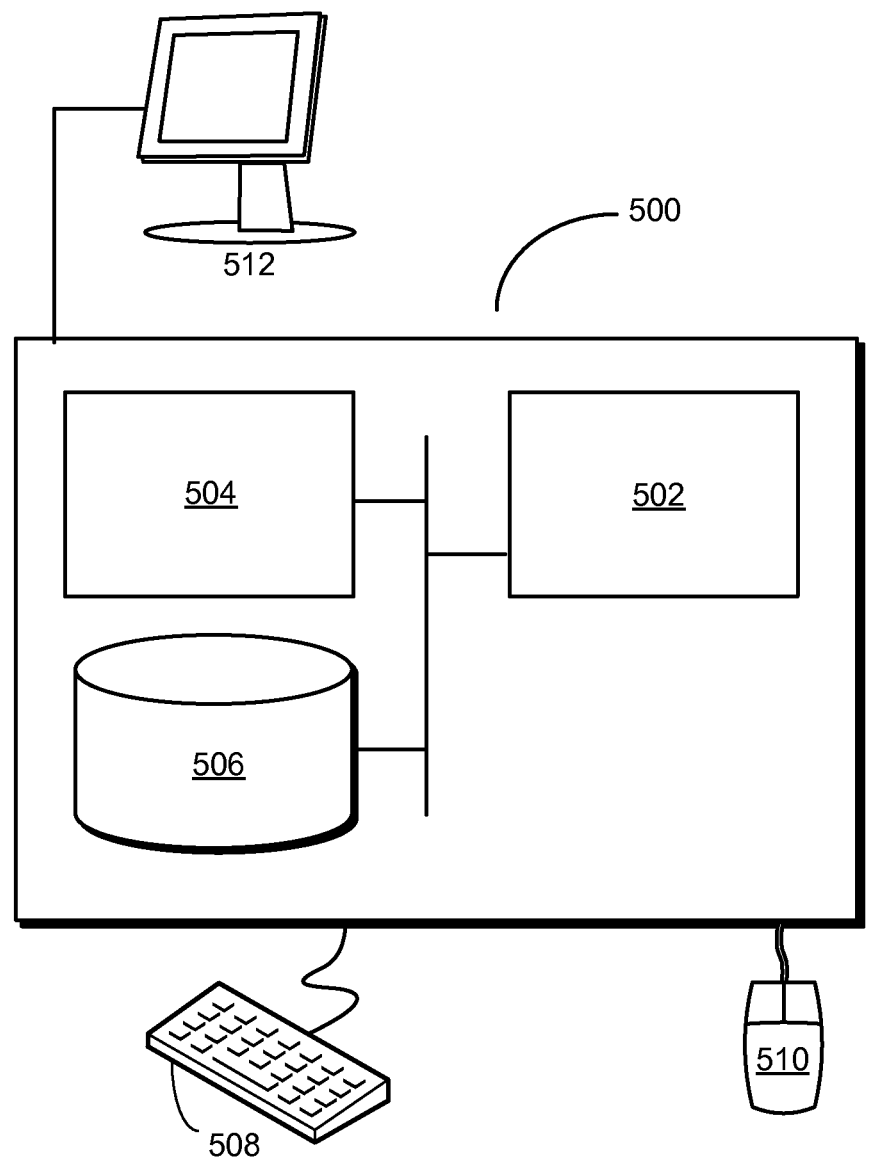
FIG. 5 shows a computer system in accordance with the disclosed embodiments.

FIG. 5 shows a computer system 500. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for improving usage of an application. The system may include an analysis apparatus that identifies, in a set of social media posts, a question related to use of the application and responds to the set of social media posts with a set of answers to the question on one or more social media platforms. The system may also include a scoring apparatus that tracks social media responses to the set of answers on the one or more social media platforms and calculates a set of relevance scores for the set of answers based on the tracked social media responses. Upon identifying the question in a subsequent social media post on a social media platform, the analysis apparatus may select an answer from the set of answers for use in responding to the question based on a relevance score of the answer and post the answer in response to the subsequent social media post. The scoring apparatus may then update the relevance score for the answer based on a social media response to the posted answer.

In addition, one or more components of computer system 500 may be remotely located and connected to the other components over a network. Portions of the present embodiments (e.g., analysis apparatus, scoring apparatus, etc.) may also be located on different nodes of a distributed system that implements the embodiments. For example, the present embodiments may be implemented using a cloud computing system that facilitates interaction with a set of remote users on a set of social media platforms.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method comprising:
   identifying, by a computing system, a question related to a product or service in a first social media post and a second social media post on one or more social media platforms by:
   obtaining a set of keywords related to the question from a keyword repository; and
   identifying one or more keywords of the set of keywords in the first social media post and the second social media post;
   posting, by the computing system, a first answer of a set of possible answers related to the product or service in response to the first social media post, wherein the first answer addresses the question in a first way;
   posting, by the computing system, a second answer of the set of possible answers related to the product or service in response to the second social media post, wherein the second answer addresses the question in a second way that is different than the first way;
   tracking, by the computing system, social media responses to the first answer and the second answer by monitoring the one or more social media platforms for social media actions that are applied to the first answer and the second answer;
   determining, by the computing system, whether each given social media action of the social media actions is positive or negative;
   calculating, by the computer system, a first relevance score for the first answer and a second relevance score for the second answer based on whether respective social media actions of the social media actions are positive or negative and based on relative strengths of the respective social media actions such that strongly positive social media actions result in higher relevance scores than less-strongly positive social media actions and strongly negative social media actions result in lower relevance scores than less-strongly negative social media actions;
   updating the set of keywords related to the question in the keyword repository based on the first relevance score and the second relevance score to produce an updated set of keywords, wherein updating the set of keywords comprises one or more of:
   adding one or more keywords in the first social media post or the second social media post to the set of keywords if the first relevance score or the second relevance score indicates that the first answer or the second answer was responded to positively; or
   removing the one or more keywords in the first social media post or the second social media post from the set of keywords if the first relevance score or the second relevance score indicates that the first answer or the second answer was not responded to positively;
   identifying, by the computing system, a subsequent social media post containing the question based on the updated set of keywords;
   selecting, by the computing system, an answer from the first answer and the second answer based on the first relevance score and the second relevance score; and posting, by the computing system, the answer in response to the subsequent social media post.

2. The method of claim 1, further comprising: updating the first relevance score or the second relevance score based on a social media response to the answer.

3. The method of claim 2, wherein updating the first relevance score or the second relevance score based on the social media response to the answer comprises:
   assigning individual relevance scores to one or more social media actions in the social media response; and
   including the individual relevance scores in a calculation of the relevance score for the answer.

4. The method of claim 3, wherein the social media actions comprises at least one of a view, a like, a dislike, a comment, a rating, a tone, a favorite, a share, a repost, a follow, an ignore, or a hide.

5. The method of claim 1, further comprising: updating the set of keywords with one or more additional keywords from the subsequent social media post based on the relevance score.

6. The method of claim 1, wherein selecting the answer from the set of possible answers based on a relevance score of the answer comprises:
   weighting a selection of the answer based on the relevance score of the answer and other relevance scores of other answers in the set of possible answers.

7. The method of claim 1, wherein each of the first relevance score and the second relevance score further represents a relevance of one possible answer of the set of possible answers to: a user demographic associated with the first social media post or the second social media post; or a timing of the first social media post or the second social media post.

8. The method of claim 1, wherein the answer comprises at least one of:
   an article related to use of the product or service; or
   support content for supporting use of the product or service.

9. The method of claim 1, wherein the product or service comprises a financial-management application.

10. An apparatus, comprising:
    one or more processors; and
    memory storing instructions that, when executed by the one or more processors, cause the apparatus to perform a method, the method comprising:
       identifying, by a computing system, a question related to a product or service in a first social media post and a second social media post on one or more social media platforms by:
          obtaining a set of keywords related to the question from a keyword repository; and
          identifying one or more keywords of the set of keywords in the first social media post and the second social media post;
       posting, by the computing system, a first answer of a set of possible answers related to the product or service in response to the first social media post, wherein the first answer addresses the question in a first way;
       posting, by the computing system, a second answer of the set of possible answers related to the product or service in response to the second social media post, wherein the second answer addresses the question in a second way that is different than the first way;
       tracking, by the computing system, social media responses to the first answer and the second answer by monitoring the one or more social media platforms for social media actions that are applied to the first answer and the second answer;
       determining, by the computing system, whether each given social media action of the social media actions is positive or negative;
       calculating, by the computer system, a first relevance score for the first answer and a second relevance score for the second answer based on whether respective social media actions of the social media actions are positive or negative and based on relative strengths of the respective social media actions such that strongly positive social media actions result in higher relevance scores than less-strongly positive social media actions and strongly negative social media actions result in lower relevance scores than less-strongly negative social media actions;
       updating the set of keywords related to the question in the key word repository based on the first relevance score and the second relevance score to produce an updated set of keywords, wherein updating the set of keywords comprises one or more of:
          adding one or more key words in the first social media post or the second social media post to the set of keywords if the first relevance score or the second relevance score indicates that the first answer or the second answer was responded to positively; or
          removing the one or more keywords in the first social media post or the second social media post from the set of keywords if the first relevance score or the second relevance score indicates that the first answer or the second answer was not responded to positively;
       identifying, by the computing system, a subsequent social media post containing the question based on the updated set of keywords;
       selecting, by the computing system, an answer from the first answer and the second answer based on the first relevance score and the second relevance score; and
       posting, by the computing system, the answer in response to the subsequent social media post.

11. The apparatus of claim 10, wherein the method further comprises: updating the first relevance score or the second relevance score based on a social media response to the answer on a social media platform of the one or more social media platforms.

12. The apparatus of claim 11, wherein updating the first relevance score or the second relevance score based on the social media response to the answer comprises:
    assigning individual relevance scores to one or more social media actions in the social media response; and
    including the individual relevance scores in a calculation of the first relevance score or the second relevance score.

13. The apparatus of claim 10, wherein the method further comprises:
    updating the set of keywords with one or more additional keywords from the subsequent social media post based on the relevance score.

14. The apparatus of claim 10, wherein selecting the answer from the set of possible answers based on a relevance score of the answer comprises:
    weighting a selection of the answer based on the relevance score of the answer and other relevance scores of other answers in the set of possible answers.

15. The apparatus of claim 10, wherein each of the first relevance score and the second relevance score further represents a relevance of one possible answer of the set of possible answers to:
- a user demographic associated with the first social media post or the second social media post; or
- a timing of the first social media post or the second social media post.

16. The apparatus of claim 10, wherein the answer comprises at least one of:
- an article related to use of the product or service; or
- support content for supporting use of the product or service.

17. A non-transitory computer-readable storage medium storing instructions that when executed by a computer cause the computer to perform a method for improving usage of an application, the method comprising:
- identifying, by a computing system, a question related to a product or service in a first social media post and a second social media post on one or more social media platforms by:
  - obtaining a set of keywords related to the question from a keyword repository; and
  - identifying one or more keywords of the set of keywords in the first social media post and the second social media post;
- posting, by the computing system, a first answer of a set of possible answers related to the product or service in response to the first social media post, wherein the first answer addresses the question in a first way;
- posting, by the computing system, a second answer of the set of possible answers related to the product or service in response to the second social media post, wherein the second answer addresses the question in a second way that is different than the first way;
- tracking, by the computing system, social media responses to the first answer and the second answer by monitoring the one or more social media platforms for social media actions that are applied to the first answer and the second answer;
- determining, by the computing system, whether each given social media action of the social media actions is positive or negative;
- calculating, by the computer system, a first relevance score for the first answer and a second relevance score for the second answer based on whether respective social media actions of the social media actions are positive or negative and based on relative strengths of the respective social media actions such that strongly positive social media actions result in higher relevance scores than less-strongly positive social media actions and strongly negative social media actions result in lower relevance scores than less-strongly negative social media actions;
- updating the set of keywords related to the question in the keyword repository based on the first relevance score and the second relevance score to produce an updated set of keywords, wherein updating the set of keywords comprises one or more of:
  - adding one or more keywords in the first social media post or the second social media post to the set of keywords if the first relevance score or the second relevance score indicates that the first answer or the second answer was responded to positively; or
  - removing the one or more keywords in the first social media post or the second social media post from the set of keywords if the first relevance score or the second relevance score indicates that the first answer or the second answer was not responded to positively;
- identifying, by the computing system, a subsequent social media post containing the question based on the updated set of keywords;
- selecting, by the computing system, an answer from the first answer and the second answer based on the first relevance score and the second relevance score; and
- posting, by the computing system, the answer in response to the subsequent social media post.

18. The non-transitory computer-readable storage medium of claim 17, the method further comprising: updating the first relevance score or the second relevance score based on a social media response to the answer on a social media platform of the one or more social media platforms.

19. The non-transitory computer-readable storage medium of claim 18, wherein updating the relevance score of the first relevance score or the second relevance score based on the social media response to the answer comprises:
- assigning individual relevance scores to one or more social media actions in the social media response; and
- including the individual relevance scores in a calculation of the first relevance score or the second relevance score.

* * * * *